United States Patent [19]

Leskovec

[11] 4,355,695
[45] Oct. 26, 1982

[54] ARTICLE RESTRAINING DEVICE

[75] Inventor: Edward V. Leskovec, Eastlake, Ohio

[73] Assignee: Towmotor Corporation, Mentor, Ohio

[21] Appl. No.: 228,812

[22] PCT Filed: Oct. 20, 1980

[86] PCT No.: PCT/US80/01396

§ 371 Date: Oct. 20, 1980

§ 102(e) Date: Oct. 20, 1980

[87] PCT Pub. No.: WO82/01353

PCT Pub. Date: Apr. 29, 1982

[51] Int. Cl.$^3$ ............................................. B60K 1/04
[52] U.S. Cl. ................................... 180/68.5; 105/51; 180/69 C; 296/37.6; 296/65 R; 429/96
[58] Field of Search .................. 180/68.5, 69 C, 69 R; 429/100, 99, 96, 97, 98; 296/65 R, 76, 37.1, 37.2, 37.6, 37.14, 37.15, 63; 105/50, 51

[56] References Cited

U.S. PATENT DOCUMENTS

| | | | |
|---|---|---|---|
| 1,845,418 | 2/1932 | Jantsch | 429/100 |
| 3,275,092 | 9/1966 | Matthews | 296/76 X |
| 3,309,235 | 3/1967 | Teeple, Sr. | 429/98 |
| 3,367,441 | 2/1968 | Schuster et al. | 180/68.5 |
| 3,787,086 | 1/1974 | Cosby | 296/65 R |
| 3,930,552 | 1/1976 | Kunkle et al. | 180/68.5 |
| 4,033,424 | 7/1977 | Evans | 180/68.5 |
| 4,108,266 | 8/1978 | Wojtyna | 180/68.5 |
| 4,213,510 | 7/1980 | Wible | 180/68.5 |
| 4,218,105 | 8/1980 | Leighty | 180/68.5 X |
| 4,252,206 | 2/1981 | Burkholder et al. | 180/68.5 |

*Primary Examiner*—Joseph F. Peters, Jr.
*Assistant Examiner*—Milton L. Smith
*Attorney, Agent, or Firm*—Richard F. Phillips

[57] ABSTRACT

A restraining device for removable components of vehicles, such as the battery unit (26) of an electrically powered lift truck. The vehicle has an enclosure frame (14) having opposite sides (16,20) each of which has an aperture (30,28) through which passes in a longitudinally slidable fashion a restraining bar (34) positionable to a locked position preventing dislocation of the removable component (26). The restraining bar (34) may be fixed against longitudinal movement by affixing it to the enclosure frame (14) with a locking means (42). If the restraining bar (34) is not in its locked position a pivotably positional cover (52) overlying both the removable component (26) and the restraining bar (34) cannot be placed in an operating position owing to contact between the restraining bar (34) and a downwardly extending edge portion (58) of the cover (52).

19 Claims, 8 Drawing Figures

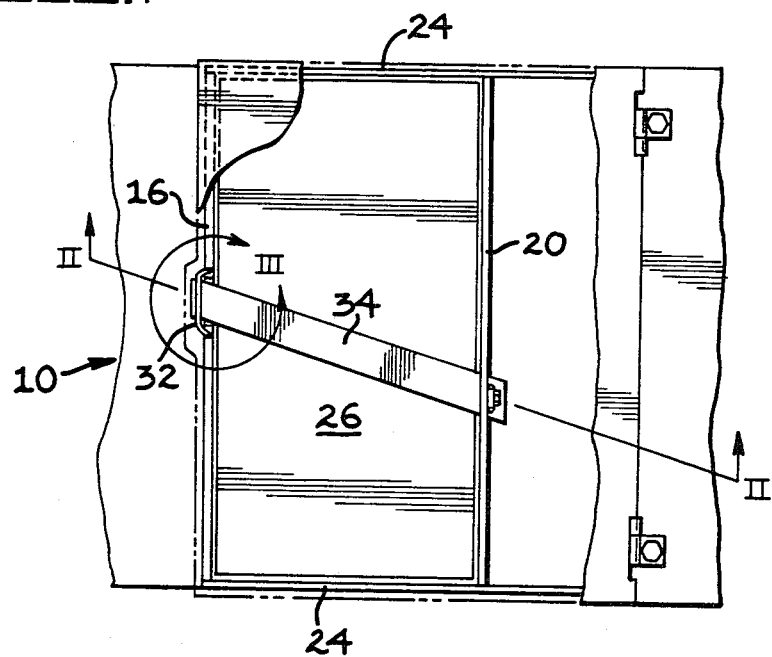
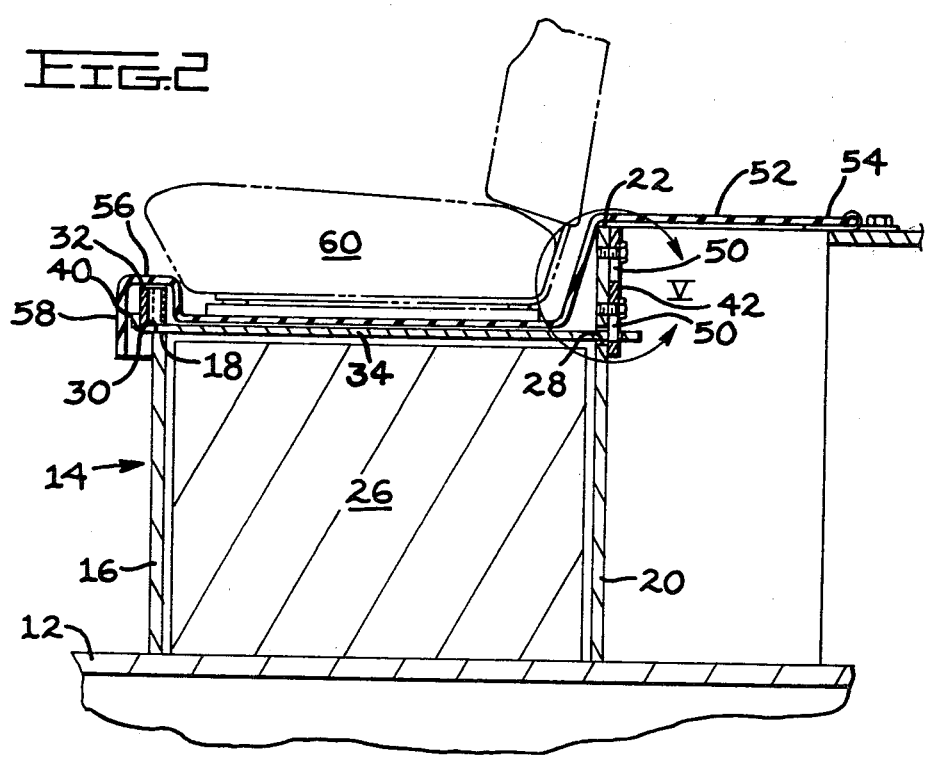

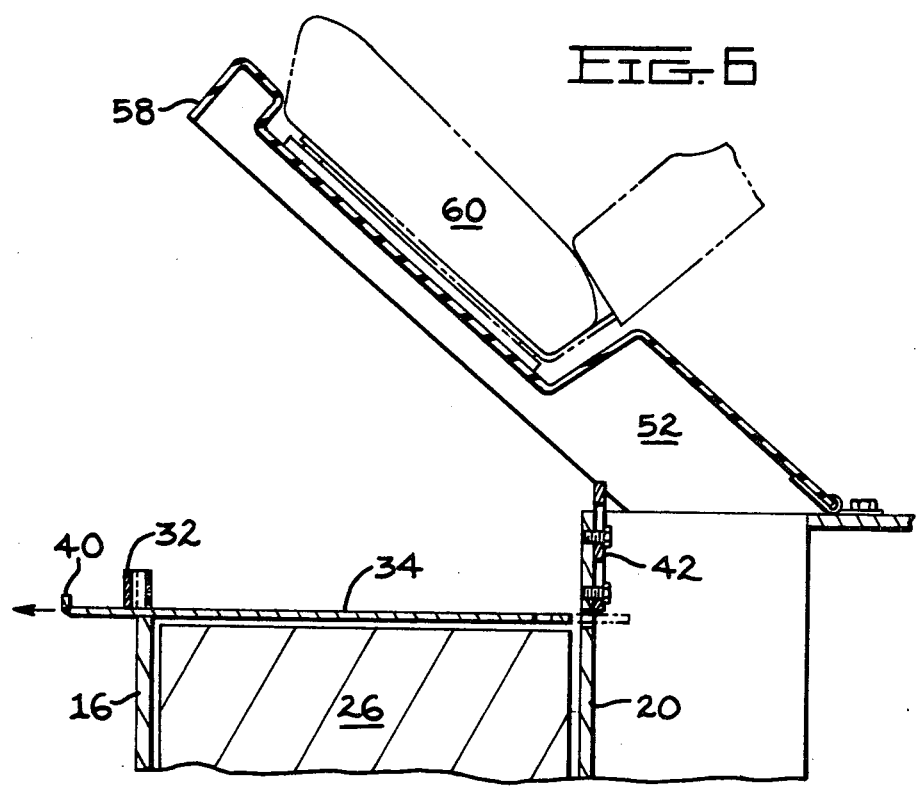
FIG. 6
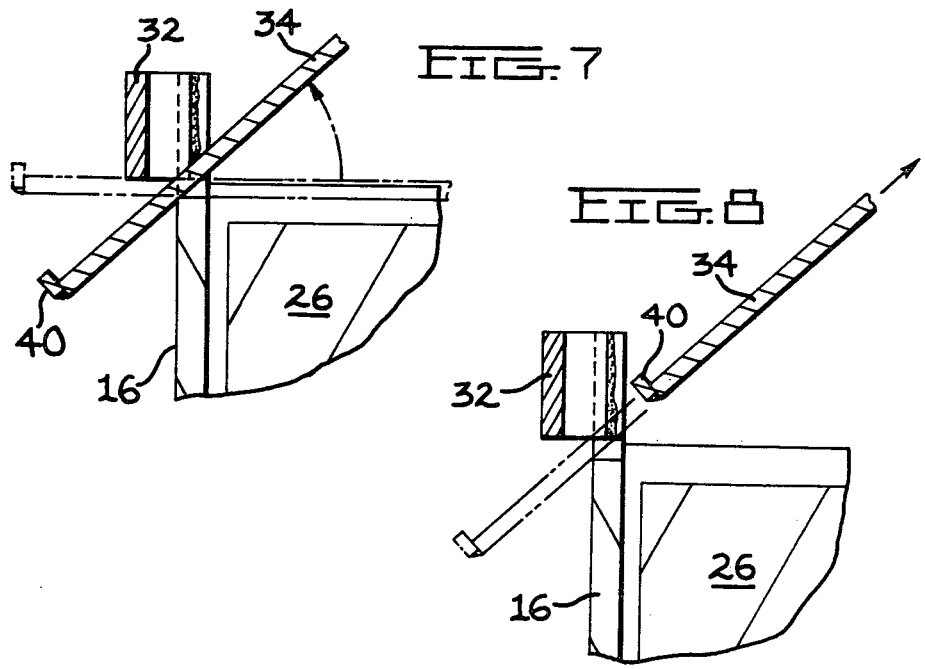
FIG. 7
FIG. 8

ARTICLE RESTRAINING DEVICE

TECHNICAL FIELD

This invention relates generally to devices for securing the position of removable components of vehicles and more particularly to battery restraints for electrically powered lift trucks.

BACKGROUND ART

It is common for battery powered vehicles to be designed so as to permit simple and swift removal of their battery unit. Typically, the battery unit rests on the frame of the vehicle and is prevented from horizontal displacement by an enclosing frame. The battery unit is accessible from a vertical direction so that a hoisting device may be positioned thereover and the battery grasped for vertical removal.

Frequent removal of battery units is a necessity for those battery powered vehicles which are subject to around the clock usage. Currently available commercial battery units typically require several hours of recharging after a few hours of service. Extensive downtime for recharging can only be avoided by replacing a discharged battery unit with a charged one.

While it is necessary that the battery unit be easily removable from a vertical direction it is also important to ensure that the battery unit be restrained from unintended vertical displacement during operation of the vehicle. To decrease the possibility of such displacement of the battery unit several restraining devices have been developed. The most relevant of these are detailed in U.S. Pat. No. 4,033,424 issued to Evans on Apr. 9, 1976, and U.S. Pat. No. 4,108,266 issued to Wojtyna on Aug. 22, 1978.

While the cited patents disclose effective battery unit restraining devices it would be advantageous were they less complex in construction. It would also be beneficial if the restraining device could not unintentionally be left in an unlocked condition.

The present invention is directed to overcoming one or more of the problems set forth above.

DISCLOSURE OF THE INVENTION

In one aspect of the present invention a restraining device for a removable component of a vehicle includes an enclosure frame preventing the removable component from horizontal movement beyond preselected bounds. A cover is movably attached to the vehicle for manipulation between an operating position overlying the component and a position spaced therefrom. Positionable through apertures in the enclosure frame and overlying the removable component is a device for vertically restraining the removable component. When in a restraining position this device will permit movement of the cover to its operating position and when not in a restraining position this device will preclude such movement of the cover to its fully operational position.

BRIEF DESCRIPTION OF THE DRAWINGS

For a better understanding of the present invention, reference may be had to the accompanying drawings in which:

FIG. 1 is a top diagrammatic view of an embodiment of the present invention;

FIG. 2 is a vertical sectional view taken along lines II—II of FIG. 1;

FIG. 6 corresponds to FIG. 2 and shows the restraining device in a first stage of removal;

FIG. 7 corresponds to FIG. 6 and shows the restraining device in a second stage of removal; and FIG. 8 corresponds to FIG. 7 and shows the restraining device totally removed.

BEST MODE FOR CARRYING OUT THE INVENTION

Figure 3:
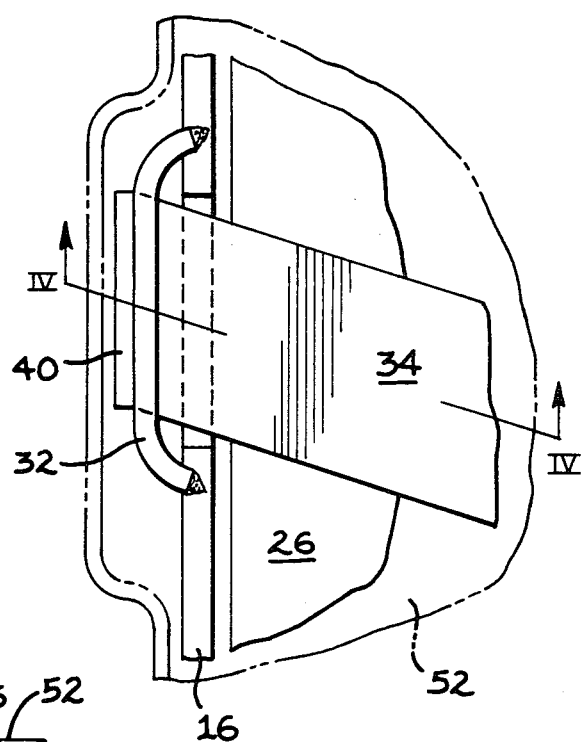
FIG. 3 is an enlarged partial diagrammatic top view of an alignment end of a restraining device in an engaged position with a cover shown in phantom outline.

Referring to FIGS. 1 and 2 an article restraining device 10 which is one embodiment of the present invention is shown mounted on a lift truck having a main frame 12 supporting a battery enclosure frame 14. The battery enclosure frame 14 includes a plurality of upwardly extending frame members, preferably a front wall 16 having an upper edge 18, a rear wall 20 having an upper edge 22, and side walls 24. A removable component such as a battery 26 is positioned in the battery enclosure frame 14.

The rear wall 20 has a rear aperture 28. Similarly, the front wall 16 has a front aperture 30. These apertures 28,30 are preferably of equal elevation, and are positioned so that a line segment joining them is angularly related to the longitudinal axis of the lift truck and passes above the battery 26 when positioned within the enclosure frame 14.

Figure 4:
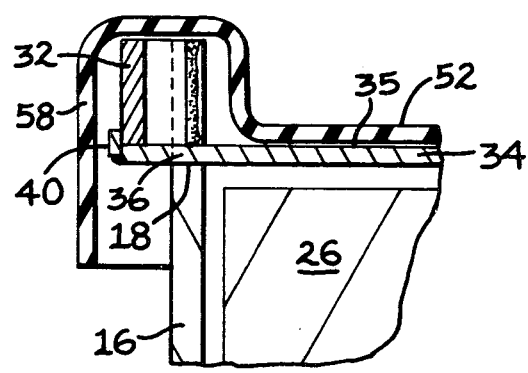
FIG. 4 is a diagrammatic cross sectional view taken along line IV—IV of FIG. 3.

In the preferred embodiment, best detailed in FIGS. 3 and 4, the front aperture 30 takes the form of a slot bounded below by the upper edge 18 of the front wall 16, and bounded above by an upper constraining strap 32. The upper constraining strap 32 is an elongated bar of metal joined by welding or the like to the front wall 16 and extending forward and upward from the front wall 16 so as to provide both horizontal and vertical clearance between the front wall upper edge 18 and the upper constraining strap 32.

A restraining bar 34 having an upper surface 35 passes through the front and rear apertures 28,30. It should be of sufficient strength that when properly engaged in these apertures 28,30 it can withstand the shock loading imposed when the battery 26 is forced against it. The restraining bar 34 is sized with respect to the apertures 28,30 so that while easily slidable therethrough, only insignificant transverse motion of the bar 34 is possible.

The restraining bar 34 has a first end portion 36 engageable in the front aperture 30 and a second end portion 38 engageable in the rear aperture 28. The first end portion 36 has a stop 40 for contacting the restraining bar 34. The purpose of this stop 40 is to prevent the front end portion 36 from passing out of the front aperture 30 when the restraining bar 34 is moved toward the rear aperture 28. It also serves to insure proper longitudinal alignment of the restraining bar 34 within the two apertures 28,30. With the stop 40 abutting the upper constraining strap 32, the restraining bar 34 is in an engaged position. This stop 40 can assume many forms but is preferably fashioned as a slight upward extension of the restraining bar 34 as best shown in FIG. 4.

The restraining bar 34 also has a locking bar aperture 41 disposed in a portion of the restraining bar 34 so located that it is adjacent the rear aperture 28 when the restraining bar 34 is in the engaged position. A locking bar 42 having lower portion 44 and an upper portion 46 is slidably attachable to the rear wall 20. This is preferably achieved with bolts 48 fixable to the rear wall 20 disposed through vertically elongated slots 50 in the locking bar 42. With the bolts 48 slightly loosened the locking bar 42 may slidably be moved vertically into and out of the locking bar aperture 41. With the locking bar 42 disposed in the locking bar aperture 41, the restraining bar 34 is locked in the engaged position.

As best shown in FIG. 2, a cover 52 is pivotally attached to the main frame 12. This cover is selectively positionable between an operating position in which it overlies the battery 26 and a battery removal position. The cover 52 has a rearward hinged end 54 and a forward end 56. The forward end 56 has a downwardly extending edge portion 58 which is sized so that when the cover 52 is in the operating position and the restraining bar 34 is in the engaged position, the downwardly extending edge portion 58 is slightly forward of and extends to a lower elevation than the restraining bar first end portion 36. An operator's seat 60 is mounted on said cover 52 and is movable therewith.

Figure 5:
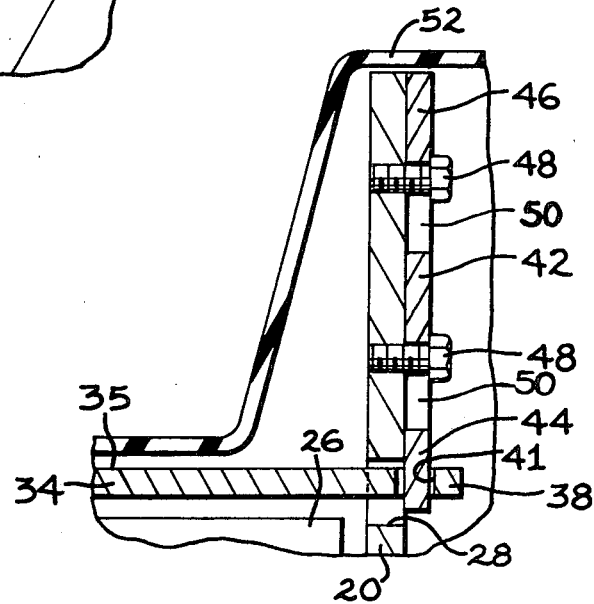
FIG. 5 is an enlarged diagrammatic sectional detail view of a locking end of the restraining device in the engaged position shown in FIG. 1.

The locking bar 42 extends upwardly a sufficient distance, as is shown in FIGS. 5 and 6, to interfere wih the cover 52 preventing it from being placed in the operating position when the locking bar 42 is in abutment with the restraining bar upper surface 35.

INDUSTRIAL APPLICABILITY

The article restraining device 10 described above is suited for restraining a vehicle component which must be frequently removed. It is particularly suited for use as a lift truck battery restraining device.

When in its locked position, the article restraining device 10 secures the battery unit 26 against vertical displacement. To ensure that the vehicle is not operated without the battery unit 26 being restrained from such displacement, the cover 52 carrying the operator's seat 60, which must be pivoted away from its operating position to remove the battery unit 26, cannot be repositioned to its operating position unless the restraining bar 34 is locked in the engaged position. The operator is thereby made aware when the battery unit 26 is not properly restrained.

This warning to the operator is accomplished in different manners for the two basic situations in which the restraining bar 36 is not locked in place. When the restraining bar 36 physically occupies the engaged position (that is, when it passes through both apertures 28,30 with the stop 40 abutting the upper constraining strap 32) but the locking bar 42 is not within the locking bar aperture 41, the locking bar 42, as is shown in FIG. 6, projects upward into the area normally occupied by the cover 52 when in its operating position. This prevents repositioning of the cover 52 to its operating position when the locking bar 42 is disengaged. Additionally, when the restraining bar 36 does not occupy the engaged position, the stop 40 and the first end portion 36 extend away from the first aperture 30 into an area normally occupied by the downwardly extending edge portion 58 of the cover 52 thereby preventing placement of the cover 52 in its operating position.

The first aperture 30 is designed to permit the restraining bar 36 to be totally withdrawn without the necessity for pulling it translationally along its length through the first aperture 30. This is advantageous in that it obviates the necessity for providing an amount of lateral clearance forward from the enclosure frame 14 equal to the length of the restraining bar 34. This removal is accomplished by withdrawing the restraining bar 34 from the rear aperture 28, rotating the restraining ar 34 so as to raise its second end portion 38 and then pulling the bar 34 through the front aperture 30. This is shown sequentially in FIGS. 6–8.

Other aspects, objects, advantages and uses of this invention can be obtained from a study of the drawings, the disclosure, and the appended claims. It should be understood that the article restraining device can assume many other configurations without departing from the claims.

I claim:

1. An article restraining device (10) for a removable component (26) of a vehicle having a main frame (12), comprising:
   a cover (52) attached to said vehicle and movable to an operating position overlying said removable component (26);
   an enclosure frame (14) having a pair of spaced upwardly extending frame members (16,20) connected to said main frame (12), one of said pair having a first aperture (30) disposed therein and the other of said pair having a second aperture (28) disposed therein; and
   restraining means (34) movable to a restraining position at which it passes through said apertures (30,28) and overlies said removable component (26), said restraining means (34) permitting movement of said cover (52) to said operating position only when said restraining means (34) occupies said restraining position.

2. the article restraining device (10) of claim 1 wherein said removable component (26) is a battery unit.

3. The article restraining device (10) of claim 2 wherein said vehicle is a lift truck.

4. The article restraining device (10) of claim 1 wherein said cover (52) includes an operator's seat (60) mounted thereon, said cover (52) being pivotally attached to said main frame (12).

5. The article restraining device (10) of claim 4 wherein said cover (52) is selectively movable between said operating position and a position in which said cover (52) is free from intersection with a vertical projection of said removable component (26).

6. The article restraining device (10) of claim 1 or claim 5 wherein said restraining means (34) includes a restraining bar (34) having a first end portion (36) and a second end portion (38), said first end portion (36) having a stop (40) attached thereto such that further movement of said restraining bar (34) through said first aperture (30) and toward said second aperture (28) is prevented when said stop (40) contacts said enclosure frame (14) adjacent said first aperture (30).

7. The article restraining device (10) of claim 6 including a locking means (42) connected to one of said upwardly extending members (16,20) adjacent one of said apertures (28,30) and movable between a restraining bar (34) locking position and a restraining bar (34) releasing position.

8. The article restraining device (10) of claim 7 wherein said locking means (42) restrains said cover (52) from being moved to said operating position when said locking means (42) is in said restraining bar (34) releasing position.

9. The article restraining device (10) of claim 7 wherein said locking means (42) includes a locking bar (42) connected to said enclosure frame (14) movable to engage said restraining bar (34).

10. The article restraining device (10) of claim 9 wherein said restraining bar (34) has a locking bar aperture (41) into which said locking bar (42) is positionable.

11. The article restraining device (10) of claim 6 wherein said cover (52) abuts said first end portion (36) preventing said cover (52) from attaining said operating position unless said stop (40) is substantially in contact with said enclosure frame (14).

12. The article restraining device (10) of claim 11 wherein said cover (52) includes a downwardly extending edge portion (58) which extends to a position elevationally lower than said restraining bar (34), said downwardly extending edge portion (58) when in said operating position being removed a horizontal distance from said restraining bar (34).

13. The restraining device (10) of claim 6 wherein said first apparatus (30) is defined by an upper constraining strap (32) and a lower plate (16) said upper constraining strap (32) being spaced a vertical and a horizontal distance from said lower plate (16) such that said first end portion (36) having said stop (40) is passable through said first aperture (30) only when said second end portion (32) is free from engagement in said second aperture (28).

14. A device (10) for restraining a removable component (26) of a vehicle, comprising:

a cover (52) attached to said vehicle and overlying said removable component (26), said cover (52) being movable between an operating position and another position;

an enclosure frame (14) having a plurality of frame members (16,20) attached to said vehicle and bordering said removable component (26);

restraining means (34) having first and second end portions (36,38) each being removably connected to one of said frame members (16,20);

locking means (42) attached to said enclosure frame (14) for releasably locking said restraining means (34) to said enclosure frame (14); and interfering means (58) for preventing said cover (52) from attaining said operating position when said locking means (42) is free from engagement with said restraining means (34).

15. The device (10) of claim 14 wherein said interfering means (58) includes a downwardly extending edge portion connected to said cover (52).

16. The device (10) of claim 14 wherein said restraining means (34) includes a rigid bar.

17. The device (10) of claim 14 wherein said removable component (26) includes a battery.

18. The device (10) of claim 14 wherein said enclosure frame (14) has a plurality of apertures (28,30) througgh which said restraining means (34) is positionable.

19. The device (10) of claim 14 wherein said locking means (42) includes a locking bar (42) attachable to said enclosure frame (14) and positionable so as to permit said locking bar (42) to be disposed within a locking bar aperture (41) in said restraining means (34).

* * * * *